US012714956B2

(12) United States Patent
Melhus

(10) Patent No.: US 12,714,956 B2
(45) Date of Patent: Aug. 25, 2026

(54) METHOD OF FILTRATING LIQUID, AND FILTRATION APPARATUS FOR FILTRATING LIQUID

(71) Applicant: RENASYS AS, Førde (NO)

(72) Inventor: Trond Melhus, Sandnes (NO)

(73) Assignee: RENASYS AS, Førde (NO)

( * ) Notice: Subject to any disclaimer, the term of this patent is extended or adjusted under 35 U.S.C. 154(b) by 356 days.

(21) Appl. No.: 18/573,743

(22) PCT Filed: Jul. 1, 2021

(86) PCT No.: PCT/EP2021/068151
§ 371 (c)(1),
(2) Date: Dec. 22, 2023

(87) PCT Pub. No.: WO2023/274535
PCT Pub. Date: Jan. 5, 2023

(65) Prior Publication Data
US 2024/0325951 A1 Oct. 3, 2024

(51) Int. Cl.
*B01D 33/04* (2006.01)
*B01D 33/50* (2006.01)
*B01D 33/80* (2006.01)
*B01D 37/04* (2006.01)

(52) U.S. Cl.
CPC ............ *B01D 33/04* (2013.01); *B01D 33/50* (2013.01); *B01D 33/807* (2013.01);
(Continued)

(58) Field of Classification Search
CPC .. B01D 33/804; B01D 33/808; B01D 33/806; B01D 33/807; B01D 37/045; B01D 37/046; B01D 2201/204
See application file for complete search history.

(56) References Cited

U.S. PATENT DOCUMENTS 6,095,343 A 8/2000 Dooley, Jr. et al.
2011/0290369 A1 12/2011 Meyer et al.

FOREIGN PATENT DOCUMENTS

DE 2816378 A1 10/1979
EP 3795229 A1 3/2021
(Continued)

OTHER PUBLICATIONS

Dieter, Walter—DE2816378 A1 machine translation—Oct. 18, 1979 (Year: 1979).*
(Continued)

*Primary Examiner* — Bradley R Spies
(74) *Attorney, Agent, or Firm* — RMCK Law Group, PLC

(57) ABSTRACT

A method of filtrating liquid, the method comprising conducting a liquid through a filtering element, through an outlet line downstream of the filtering element and to a collection volume downstream of the outlet line; controlling a differential pressure of the liquid over the filtering element; and controlling a passing time of a filter flow of the liquid through the filtering element in conjunction with the differential pressure; wherein the control of the differential pressure and the passing time comprises controlling a collection volume liquid flow of the liquid out from the collection volume; and controlling a gas flow out from the collection volume. A filtration apparatus for filtrating liquid is also provided.

17 Claims, 5 Drawing Sheets

(52) U.S. Cl.
CPC ......... *B01D 33/808* (2013.01); *B01D 37/045* (2013.01); *B01D 37/046* (2013.01)

(56) References Cited

FOREIGN PATENT DOCUMENTS

| | | | |
|---|---|---|---|
| JP | S55021021 | U1 | 2/1980 |
| JP | S6470110 | A | 3/1989 |
| JP | 2018202300 | A | 12/2018 |
| KR | 20100136994 | A | 12/2010 |
| WO | 2011096802 | A1 | 8/2011 |
| WO | 2020164730 | A1 | 8/2020 |
| WO | 2021101379 | A1 | 5/2021 |

OTHER PUBLICATIONS

PCT International Preliminary Report on Patentability dated Aug. 28, 2023 for International Application No. PCT/EP2021/075694, 38 pages.
PCT International Preliminary Report On Patentability dated May 23, 2023 for International Application No. PCT/EP2021/068151, 48 pages.
PCT International Search Report and Written Opinion dated Apr. 14, 2022 for International Application No. PCT/EP2021/075694, 17 pages.
PCT International Search Report and Written Opinion mailed Feb. 23, 2022 for International Application No. PCT/EP2021/068151, 12 pages.

* cited by examiner

METHOD OF FILTRATING LIQUID, AND FILTRATION APPARATUS FOR FILTRATING LIQUID

CROSS-REFERENCE TO RELATED APPLICATIONS

This application is a 371 U.S. National Stage of International Application No. PCT/EP2021/068151, filed Jul. 1, 2021. The disclosure of the above application is incorporated herein by reference in its entirety.

TECHNICAL FIELD

The present disclosure generally relates to liquid filtration. In particular, a method of filtrating liquid and a filtration apparatus for filtrating liquid, are provided.

BACKGROUND

One of the major challenges in the world today is to provide safe drinking water for humans and animals. Some main contributions to pollution of water come from untreated sewage, untreated process water from industries, agricultural waste and runoff water. This water needs to be treated before it is safe to drink.

One way to provide safe drinking water from polluted water is to evaporate the polluted water under vacuum. By changing the phase of the water to steam under vacuum, the water is boiling at a low temperature. The disadvantage with this method is that it requires a lot of energy to change the phase of the water to steam under vacuum.

WO 2020164730 A1 discloses a filtration apparatus for filtrating particles from fluid, the filtration apparatus comprising a filtration vessel; at least one filtering element for removing particles from fluid passing therethrough, the at least one filtering element being arranged to move along a path into the filtration vessel, and out from the filtration vessel; a filtration inlet arranged to convey a mixture of particles and fluid to the at least one filtering element within the filtration vessel; and a filtration outlet arranged to convey fluid, filtrated by the at least one filtering element, out from the filtration vessel; wherein the filtration apparatus is configured to establish a differential pressure over the at least one filtering element inside the filtration vessel.

DE 2816378 A1 discloses a filter stand and a method therefor. The filter stand comprises a filter element arranged on a belt, a suction line, a collection tank, a vacuum pump and a filtrate pump. A required underpressure in the collection tank is generated by the vacuum pump.

WO 2021101379 A1 discloses a filter device comprising a filter cloth, a first compartment, a second compartment, a pump and a vacuum pump. An underpressure can be created in the second compartment by suctioning filtered water out from the second compartment using the pump. The vacuum pump can create an underpressure within the second compartment such that liquid situated in the first compartment will be pulled with force through the filter cloth.

SUMMARY

One object of the present disclosure is to provide a method of efficiently filtrating liquid.

A further object of the present disclosure is to provide a method of filtrating liquid, which method efficiently kills living organisms in the liquid.

A still further object of the present disclosure is to provide a method of filtrating liquid, which method is energy efficient.

A still further object of the present disclosure is to provide a method of filtrating liquid, which method is cost-efficient.

A still further object of the present disclosure is to provide a method of filtrating liquid, which method is environmentally friendly.

A still further object of the present disclosure is to provide a method of filtrating liquid, which method can filtrate large volumes of liquid over long periods of time.

A still further object of the present disclosure is to provide a method of filtrating liquid, which method solves several or all of the foregoing objects in combination.

A still further object of the present disclosure is to provide a filtration apparatus for filtrating liquid, which filtration apparatus has a compact design.

A still further object of the present disclosure is to provide a filtration apparatus for filtrating liquid, which filtration apparatus solves one, several or all of the foregoing objects.

According to one aspect, there is provided a method of filtrating liquid, the method comprising conducting a liquid through a filtering element, through an outlet line downstream of the filtering element and to a collection volume downstream of the outlet line; controlling a differential pressure of the liquid over the filtering element; and controlling a passing time of a filter flow of the liquid through the filtering element in conjunction with the differential pressure; wherein the control of the differential pressure and the passing time comprises controlling a collection volume liquid flow of the liquid out from the collection volume; and controlling a gas flow out from the collection volume.

The method may be carried out with a filtration apparatus of any type according to the present disclosure. The method may be used in various applications. The method may for example be used to provide safe drinking water or to clean water from fish farms. In the latter case, outlet water from the fish farm may be recirculated through a filtration apparatus as described herein before being returned to the fish farm. The method may be used to filtrate any liquid where it is desired to reduce an amount of living organisms. The inlet water to the filtering element may or may not be pretreated. Examples of pretreatment include precleaning and preheating.

All living organisms, such as bacteria and parasites, have a membrane. Living organisms therefore react to changes in pressure. Living organisms can tolerate sudden increases in pressure quite well, but not sudden pressure drops. If a human is exposed to a sudden pressure drop from atmospheric pressure of 1 bar to 500 mbar, the human's lungs will burst and the human's blood will start boiling by releasing gases such as dioxygen and carbon dioxide. The normal lung volume of a human at atmospheric pressure is six liters. With a pressure drop from 1 bar to 250 mbar, the lung volume will expand to 24 liters, and so on. Although bacteria and parasites do not have lungs, they have liquid inside their membranes containing dissolved gases, which with a sudden pressure drop will expand inside the membranes and cause the membranes to burst. A rapid pressure drop will therefore kill the bacteria and the parasites.

The pressure of the liquid in the outlet line immediately downstream of the filtering element is referred to as an underpressure or outlet pressure. The pressure of the liquid immediately upstream of the filtering element may be referred to as an inlet pressure. When carrying out the method, the inlet pressure may be atmospheric or substantially atmospheric (e.g. 995 mbar to 1035 mbar).

The method may further comprise monitoring the underpressure in the outlet line immediately downstream of the filtering element. The underpressure may be monitored by means of a pressure sensor according to the present disclosure.

The collection volume liquid flow may be controlled by means of a liquid outlet device. The liquid outlet device may be of any type according to the present disclosure. By means of the liquid outlet device, the underpressure of the liquid can be controlled.

The gas flow out from the collection volume may be controlled by means of a gas outlet device. The gas outlet device may be of any type according to the present disclosure.

Moving liquids, like water, can contain high amounts of energy. This is evidenced by the phenomenon of a water hammer that can cause a lot of damage to pipes, valves and other equipment by a sudden stop of a water flow.

By controlling the differential pressure in conjunction with the passing time, the method can provide a controlled energy release from the liquid. The collection volume liquid flow and the gas flow may for example be controlled in conjunction based on a target underpressure in the outlet line. The higher the differential pressure is and the shorter the passing time is, the higher is the energy release from the liquid. By generating a sufficiently high energy release from the liquid through the filtering element in a sufficiently short passing time, any living organisms in the liquid will be killed. By subjecting living organisms in the liquid to a high energy release, e.g. to a high pressure drop in a few microseconds, the membranes of any living organisms in the liquid will be ruptured and the living organisms will be efficiently killed. The energy release from the liquid provided by the method thereby causes residual contaminants to be eliminated to a very large degree. The method will therefore have a huge impact on liquid cleaning, e.g. to provide safe drinking water.

The method further enables gases released from the liquid in the collection volume to be evacuated. Examples of such gases are carbon dioxide, nitrogen, dioxygen and ammonium. The gases are inter alia generated when the membranes of the living organisms burst when subjected to the rapid pressure decrease through the filtering element. The gases will elevate to the liquid surface before leaving the liquid. By monitoring an underpressure immediately downstream of the filtering element and a temperature of the liquid, it becomes possible to see at what underpressure and at what temperature the different gases are released (flesh of) from the liquid. In general, more gases are generated the higher the differential pressure is.

The method may thus further comprise monitoring a temperature of the liquid. The temperature may be monitored by means of a temperature sensor according to the present disclosure.

By controlling the gas flow out from the collection volume, the gas pressure of gases released from the liquid inside the collection volume can be controlled. The gas pressure affects the pressure of the liquid in the collection volume, which in turn affects the differential pressure over the filtering element. By controlling the gas flow out from the collection volume, the underpressure downstream of the filtering element can be controlled and stabilized.

The method may comprise controlling the liquid level in the collection volume such that the liquid level is geodetically higher than a geodetic height of an outlet of the outlet line into the collection volume. In this way, it can be prevented that the gases enter the outlet line from the collection volume. To this end, the filtration apparatus may comprise an outlet level sensor configured to monitor an outlet level of liquid in the collection volume. The liquid level in the collection volume may thus be referred to as an outlet level of liquid.

Throughout the present disclosure, the liquid may be water. The energy it takes to change the pressure of water from a relatively low pressure to a relatively high pressure can be determined as the flow of water times the gravity force times a lifting height. The corresponding energy is released when the water undergoes a pressure decrease from the relatively high pressure to the relatively low pressure. By controlling the passing time, also the power can be controlled.

The flow speed or velocity of the liquid through the filtering element can be determined as the filter flow divided by the active filter area of the filtering element. The passing time can be determined as the thickness or active depth of the filtering element divided by the flow speed. The method enables the filter flow and the differential pressure to be controlled exactly.

The filtering element may for example be provided on a continuous belt. The filtering element may be moved continuously or intermittently when carrying out the method. Over time, the filtering element clogs. When the clogging increases, the flow speed of the liquid through the filtering element increases.

Alternatively, the method may employ one or more stationary filtering elements. In case a plurality of filtering elements are provided, these are arranged in parallel and the active filter area may thus be composed of more than one filtering element.

The outlet line may only open to at least one upstream filtering element and to the downstream collection volume. A certain drop of liquid may be provided in the outlet line. The liquid drop may comprise a geodetic height difference of one meter to ten meters. The height of the liquid drop affects the differential pressure over the filtering element. By controlling the differential pressure over the filtering element, the liquid flow through the filtering element can be controlled without using a liquid pump. The method will therefore reduce the carbon footprint.

The outlet line may comprise a pipe. In this case, the pipe may be a drop pipe. The pipe may for example be vertically oriented or inclined, e.g. up to 45 degrees or more, with respect to vertical. The collection volume may be a tank.

The method may further comprise conducting the liquid through an upstream filter, upstream of the filtering element, prior to conducting the liquid through the filtering element. The upstream filter may be a coarse filer, i.e. having a substantially higher permeability than the filtering element.

The control of the differential pressure and/or the control of the passing time may further comprise controlling an inlet flow of the liquid to the filtering element; controlling a filter speed of the filtering element; controlling an active filter area of the filtering element; controlling the filter flow; controlling a flow speed of the filter flow; and/or controlling an outlet line flow of the liquid in the outlet line.

The inlet flow may be controlled by means of a liquid inlet device according to the present disclosure. For example, the liquid inlet device may be controlled such that a liquid level in a vessel upstream of the filtering element is held substantially constant, or constant. To this end, the liquid inlet device may be controlled based on signals from an inlet level sensor. The inlet level sensor is configured to monitor an inlet level of liquid, for example in the vessel. By controlling the liquid outlet device in conjunction with the gas outlet device and the liquid inlet device, gases can be evacuated from the collection volume and a target underpressure immediately downstream of the filtering element can be accurately held.

The filter speed of the filtering element may be controlled by a motor. In case the filtering element is arranged on a continuous belt, the motor may drive the belt.

The filter flow can for example be controlled by controlling the active filter area and/or by controlling the filter speed. By reducing the filter speed, the particles will successively clog the filtering element to thereby reduce the permeability of the filtering element. When the permeability of the filtering element is reduced, the differential pressure over the filtering element will increase.

The outlet line may have a geodetic difference in height of at least one meter. By means of the geodetic difference in height of the outlet line, a gravity force of a liquid column in the outlet line pulls the liquid through the filtering element. When the geodetic difference in height of the outlet line is high enough to obtain a desired differential pressure, the liquid outlet device may be constituted by a valve instead of a liquid pump. In this way, the method can be carried out more energy efficient.

The differential pressure may be established by means of downstream movement of the liquid in the outlet line. When the liquid moves downstream in the outlet line, more room is made available upstream of the liquid in the outlet line. This creates the underpressure below the filtering element.

The passing time may be controlled to be less than 0.1 s, such as less than 0.01 s, such as less than 0.001 s.

The differential pressure may be controlled to at least 0.1 bar, such as at least 0.5 bar, such as at least 0.8 bar. Alternatively, or in addition, the underpressure may be controlled to 0.9 bar or less, such as to 0.5 bar or less, such as to 0.2 bar or less. By passing liquid through the filtering element such that the liquid undergoes a pressure change of at least 0.1 bar in 0.1 s or less, living organisms in the liquid will be killed.

The filtering element may have a substantially constant, or constant, permeability for filtrations after a nominal degree of clogging of the filtering element. For example, the filtering element successively clogs for an initial number of filtration cycles, where each filtration cycle comprises filtration of the liquid and a succeeding cleaning, such as backwashing. The permeability of the filtering element is then substantially constant, or constant, for filtration cycles following the initial number of filtration cycles. One example of such filtering element is Minimesh® RPD HIFLO-S sold by Haver & Boecker, such as RPD HIFLO 5 S, 10 S, 15 S, 20 S, 30 S or 40 S.

The filtering element may comprise a wire cloth, such as a metal wire cloth or alloy wire cloth, having a three-dimensional pore geometry. Such filtering element can provide a substantially constant, or constant, permeability for filtrations after a nominal degree of clogging of the filtering element. The wire cloth may comprise warp wires and weft wires crossing each other and interwoven by a weave pattern. The warp wires may be formed in at least two different configurations to define warp wires of first and second types. A length of the first type of warp wires may deviate from a length of the second type of warp wires in relation to a particular length unit. Pores may be formed in interstices between sections of two neighbouring warp wires and crossing sections of two neighbouring weft wires.

One example of a wire cloth according to the present disclosure is Minimesh® RPD HIFLO-S sold by Haver & Boecker, such as RPD HIFLO 5 S, 10 S, 15 S, 20 S, 30 S or 40 S. Such wire cloths have exceptionally high permeabilities and higher filtride carrying capacity in comparison with other filters of the same pore size, and can perform filtration over a wide range of differential pressures. A further example of a wire cloth according to the present disclosure is also described in US patent application US 2011290369 A1. The at least one filtering element may be acid resistant, corrosion resistant, pressure resistant and/or temperature resistant.

The collection volume may have a horizontal extension and a vertical extension, where the horizontal extension is larger than the vertical extension. A horizontal area of the collection volume may be at least twice the square of the vertical extension. For example, if the vertical extension of the collection volume is 2 meters, the horizontal area of the collection volume may be at least 4 square meters. By providing the collection volume with a relatively large horizontal area, gases in the liquid are more effectively released from the liquid. The increased release of gases in turn improves the control of the method.

The collection volume is closed to atmosphere. In this case, no direct communication between the collection volume and the atmosphere exists. According to one example, the only interfaces to the exterior of the collection volume are the outlet line, the liquid outlet device and the gas outlet device.

The filtration apparatus may comprise a plurality of downstream volumes arranged in parallel and downstream of the liquid outlet device. Each downstream volume may comprise a downstream tank. In this case, the method may further comprise alternatingly supplying the collection volume liquid flow to the downstream volumes.

According to a further aspect, there is provided a filtration apparatus for filtrating liquid, the filtration apparatus comprising a filtering element; an outlet line downstream of the filtering element; a collection volume downstream of the outlet line; a liquid outlet device configured to control a collection volume liquid flow of the liquid out from the collection volume; a gas outlet device configured to control a gas flow out from the collection volume; and a control system configured to control a differential pressure of the liquid over the filtering element; and control a passing time of a filter flow of the liquid through the filtering element in conjunction with the differential pressure; wherein the control of the differential pressure and the passing time comprises controlling the liquid outlet device to control the collection volume liquid flow; and controlling the gas outlet device to control the gas flow.

The liquid outlet device and the gas outlet device may be arranged in parallel. The liquid outlet device may for example comprise a proportional valve. Alternatively, the liquid outlet device may comprise a liquid pump, such as a lobe pump.

The gas outlet device may for example comprise a vacuum pump. The vacuum pump can thus be used to suck dissolved gases out from the collection volume and discharge the gases, e.g. to the atmosphere. Alternatively, or in addition, the gas outlet device may comprise one or more valves, e.g. constant pressure valves. In any case, the gas outlet device may be positioned at, and/or connected to, a geodetically highest section of the collection volume.

The filtration apparatus may further comprise a temperature sensor for monitoring the temperature of the liquid. The temperature sensor may be arranged in the collection volume.

The filtration apparatus enables filtering of the liquid by means of the filtering element, killing of living organisms in the liquid by means of a rapid pressure decrease, and evacuation of gases released from the liquid in a single apparatus. The filtration apparatus can be made compact even when performing all these functions.

The filtration apparatus may further comprise a motor for moving the filtering element. In this case, the control system may be configured to control the motor to thereby control a filter speed of the filtering element in order to at least partly control the differential pressure and/or the passing time.

Alternatively, the filtration apparatus may comprise one or more stationary filtering elements. In case a plurality of filtering elements are provided, these are arranged in parallel. The outlet line may in this case comprise a common section and a filter section associated with, and downstream of, each filtering element. The filter sections may join in the common section. Thus, the common section may branch into the filter sections in an upstream direction.

The control of the differential pressure and the passing time may further comprise controlling an inlet flow of the liquid to the filtering element; controlling a filter speed of the filtering element; controlling an active filter area of the filtering element; controlling the filter flow; controlling a flow speed of the filter flow; and/or controlling an outlet line flow of the liquid in the outlet line.

The filtration apparatus may further comprise a liquid inlet device positioned upstream of the filtering element, e.g. on an inlet line. By means of the liquid inlet device, the inlet flow of the liquid to the filtering element can be controlled.

The filtration apparatus may further comprise an upstream filter. The upstream filter may be positioned between the inlet line and the filtering element or in the inlet line.

The filtration apparatus may further comprise a vessel. The vessel may be positioned between the inlet line and the filtering element. In one example, the upstream filter is integrated in the vessel, e.g. in a bottom thereof.

In some variants, relatively small volumes of liquid may be manually poured into the inlet line and/or into the vessel. The filtration apparatus can thus also be used for relatively small scale implementations, e.g. to provide safe drinking water in smaller communities.

The filtration apparatus may further comprise a plurality of restriction members. The restriction members may be positioned downstream of the filtering element, such as immediately downstream of an active filter part of the filtering element. By adding or removing one or more restriction members, the active filter area of the filtering element is reduced or increased, respectively. By means of the restriction members, the inlet flow to the filtering element can be preset. When the active filter area is reduced, the liquid level in the vessel is increased and vice versa, if all other parameters are held constant. Each restriction member can be selectively moved into and out from the liquid path. According to one example, the restriction members are restriction plates that can be manually moved into and out from the liquid path.

The outlet line may have a geodetic difference in height of at least one meter.

The filtration apparatus may be configured to establish the differential pressure by means of downstream movement of the liquid in the outlet line.

The control system may be configured to control the passing time to be less than 0.1 s, such as less than 0.01 s, such as less than 0.001 s.

The control system may be configured to control the differential pressure to at least 0.1 bar.

The filtering element may have a substantially constant, or constant, permeability for filtrations after a nominal degree of clogging of the filtering element.

The collection volume may have a horizontal extension and a vertical extension. In this case, the horizontal extension may be larger than the vertical extension.

The collection volume is closed to atmosphere.

The filtration apparatus may further comprise a plurality of downstream volumes arranged in parallel and downstream of the liquid outlet device. Each downstream volume may comprise a downstream tank. In this case, the control system may be configured to control the liquid outlet device to alternatingly supply the collection volume outlet flow to the downstream volumes.

The provision of a plurality of downstream volumes enables one downstream volume to be filled at the same time as one downstream volume is being emptied. Moreover, the plurality of downstream volumes enables operational redundancy of the filtration apparatus.

The control system may be in signal communication with several or all of the liquid inlet device, the belt motor, one or more valves, pressure sensors, level sensors, temperature sensors, the one or more liquid outlet devices and the gas outlet device. The signal communication may for example take place via an electrical bus system.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
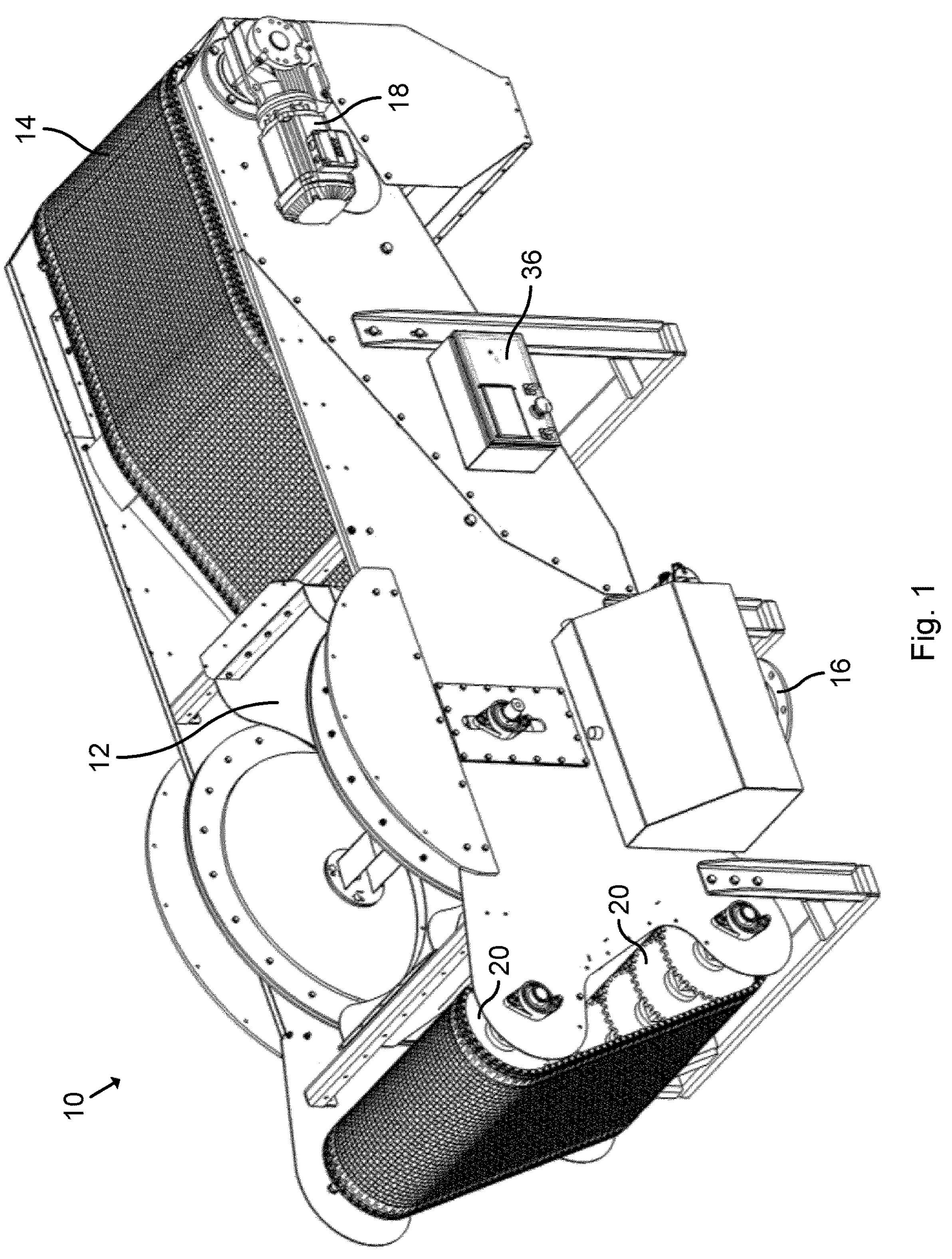
FIG. 1: represents a perspective side view of one example of a filtration unit of a filtration apparatus.

In the following, a method of filtrating liquid and a filtration apparatus for filtrating liquid, will be described. The same or similar reference numerals will be used to denote the same or similar structural features.

Figure 2:
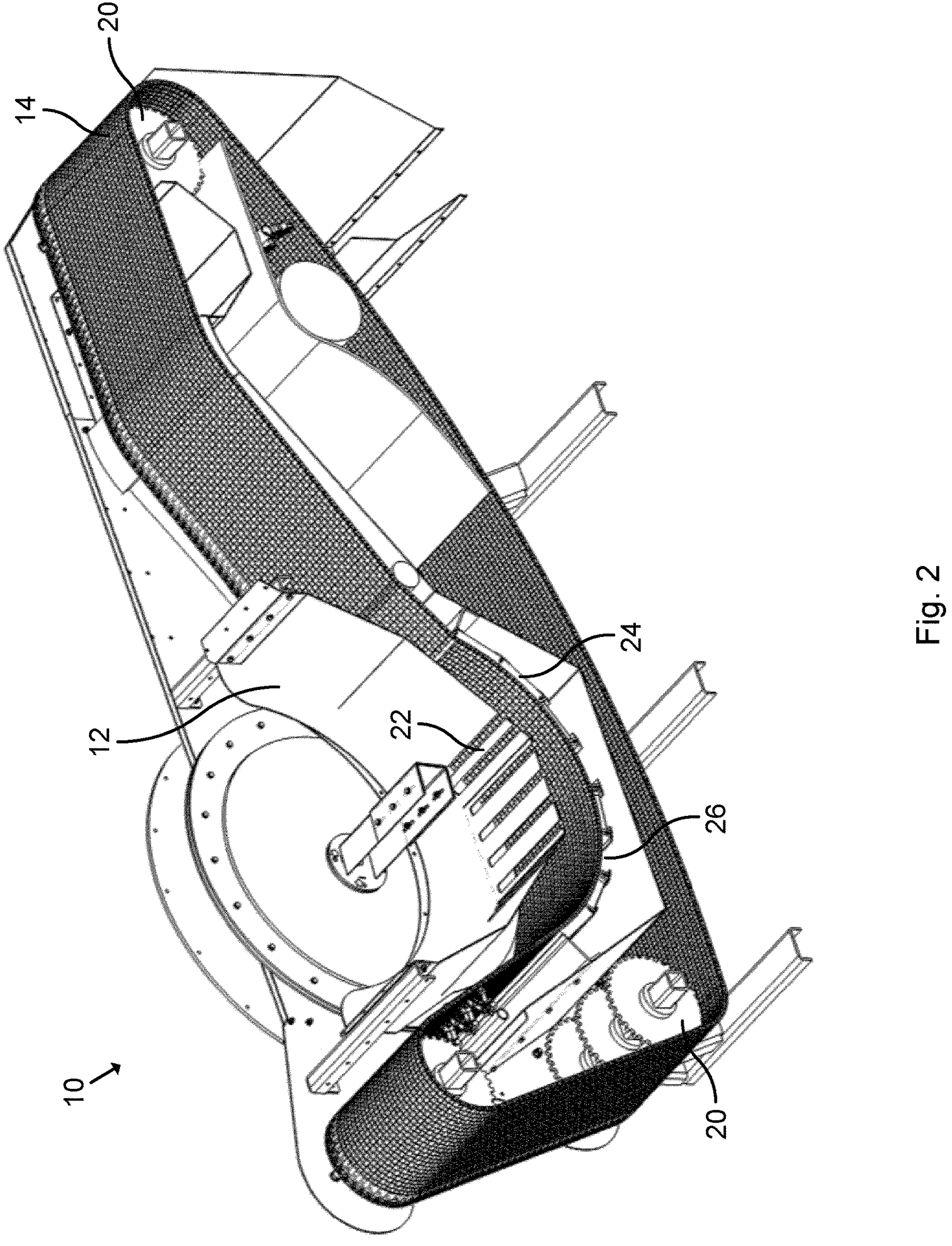
FIG. 2: represents a cross-sectional perspective side view of the filtration unit in FIG. 1.

FIG. 1 represents a perspective side view of one example of a filtration unit 10, and FIG. 2 represents a cross-sectional perspective side view of the filtration unit 10 in FIG. 1. With collective reference to FIGS. 1 and 2, the filtration unit 10 of this example comprises a vessel 12, a filtering element 14 and an outlet line 16. The outlet line 16 is only partly shown in FIG. 1. The filtering element 14 is arranged downstream of the vessel 12. The outlet line 16 is arranged downstream of an active part of the filtering element 14. The vessel 12 is open to atmosphere.

The filtering element 14 of this example is a continuous belt. The filtering element 14 is movable into an out from a filtration area. The filtration area is in this example provided below the vessel 12. The width of the filtering element 14 may for example be 60 cm or larger, such as 132 cm. The filtering element 14 may for example have a pore size of at least 1 μm and/or less than 50 μm. The filtering element 14 may for example have a thickness of 0.20 mm to 0.25 mm.

The filtering element 14 of this example is a metal wire cloth having a three-dimensional pore geometry. The wire cloth comprises warp wires and weft wires crossing each other and interwoven by a weave pattern. The warp wires are formed in at least two different configurations to define warp wires of first and second types. Pores are formed in interstices between sections of two neighboring warp wires and crossing sections of two neighboring weft wires. Due to this three-dimensional pore geometry, the filtering element 14 has a constant permeability after a certain degree of clogging, for example when subjected to backwashing after each filtration cycle. The filtering element 14 may for example be of the type Minimesh® RPD HIFLO-S sold by Haver & Boecker, such as RPD HIFLO 5 S, 10 S, 15 S, 20 S, 30 S or 40 S.

The filtration unit 10 further comprises an electric motor 18. The motor 18 is configured drive the filtering element 14 and is configured to control the speed of the filtering element 14. The filtration unit 10 of this example further comprises a plurality of rollers 20. The rollers 20 guide the filtering element 14 along a movement path. The motor 18 is here arranged to drive one of the rollers 20 to cause the filtering element 14 to move along the movement path.

As shown in FIG. 2, the filtration unit 10 further comprises an upstream filter 22. The upstream filter 22 is here exemplified as a plurality of openings in the bottom of the vessel 12. The upstream filter 22 has a substantially higher permeability than the filtering element 14 and may therefore be referred to as a coarse filter.

As further shown in FIG. 2, the filtration unit 10 of this example further comprises a plurality of restriction plates 24. The restriction plates 24 are examples of restriction members according to the present disclosure. The filtration unit 10 also comprises a plurality of slots 26. The restriction plates 24 and the slots 26 are provided below an active part of the filtering element 14. Each slot 26 is configured to selectively receive an associated restriction plate 24. In FIG. 2, there are eight slots 26 and one restriction plate 24 is received in each of the first, second, fourth, sixth, seventh and eighth slot 26 (as counted from left to right in FIG. 2). Thus, the third and fifth slots 26 are open such that liquid can pass therethrough.

By selectively inserting or removing the restriction plates 24, an active filter area of the filtering element 14 can be adjusted. The restriction plates 24 may be manually inserted or removed. The filtration unit 10 may for example comprise 2-20 restriction plates 24 and a corresponding number of slots 26. The active filter area of the filtering element 14 may for example be varied from 50 $cm^2$ to 600 $cm^2$ by means of the restriction plates 24.

Figure 3:
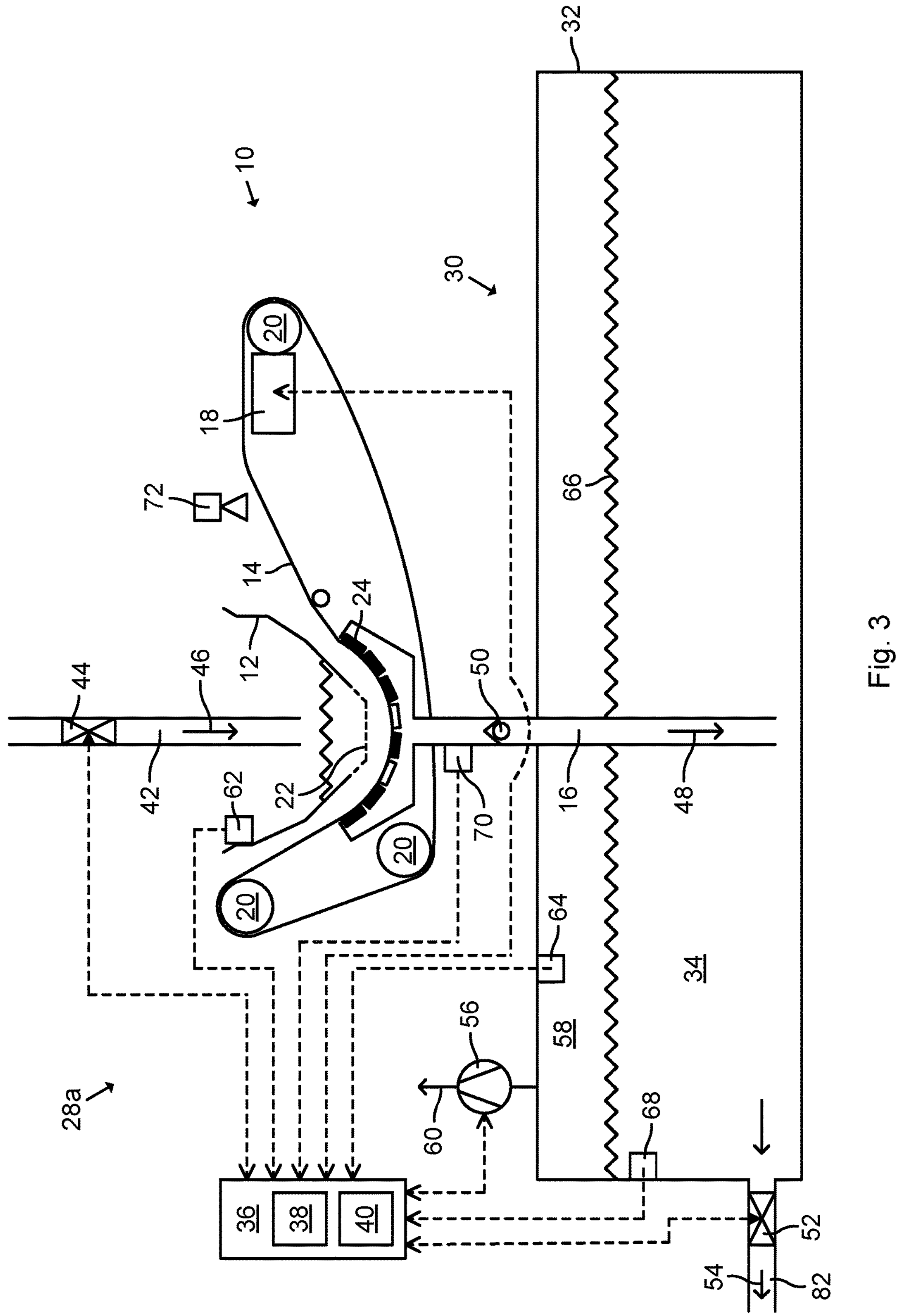
FIG. 3: schematically represents a cross-sectional side view of the filtration apparatus comprising the filtration unit and a collection volume unit.

FIG. 3 schematically represents a cross-sectional side view of a filtration apparatus **28*a*. In addition to the filtration unit 10, the filtration apparatus 28*a* further comprises a collection unit 30. As shown in FIG. 3, the collection unit 30 is positioned vertically below the filtration unit 10. The collection unit 30 comprises a collection tank 32. The collection tank 32 is one example of a collection volume according to the present disclosure. The liquid is here exemplified as water 34**.

The filtration apparatus **28*a* further comprises a control system 36. The control system 36 comprises a data processing device 38 and a memory 40 having a computer program stored thereon. The computer program comprises program code which, when executed by the data processing device 38 causes the data processing device 38** to perform, or command performance of, various steps as described herein.

The filtration apparatus **28*a* of this example further comprises an inlet line 42. The inlet line 42 is here exemplified as a vertical pipe for conducting water to be filtrated to the vessel 12. The upstream filter 22 is positioned between the inlet line 42 and the filtering element 14**.

The filtration apparatus **28*a* of this example further comprises an inlet valve 44. The inlet valve 44 is one example of a liquid inlet device according to the present disclosure. By controlling the inlet valve 44, an inlet flow 46 through the inlet line 42 of water to be filtrated can be controlled. The inlet valve 44 is in signal communication with the control system 36. The control system 36 can control an opening degree of the inlet valve 44**.

In FIG. 3, one example of the outlet line 16 can be seen. The outlet line 16 is here exemplified as a vertical pipe. The outlet line 16 does however not necessarily need to be vertically oriented. An upstream and geodetically highest end of the outlet line 16 is open to the filtering element 14. A downstream and geodetically lowest end of the outlet line 16 is open to the collection tank 32. Besides the upstream end and the downstream end, the outlet line 16 is closed. The outlet line 16 thus conducts water from the filtering element 14 to the collection tank 32. The outlet line 16 provides a connection between the filtration unit 10 and the collection unit 30. Reference numeral 48 in FIG. 3 denotes an outlet line flow through the outlet line 16. The filtration apparatus **28*a* further comprises a one-way outlet line valve 50 in the outlet line 16**, here exemplified as a check valve.

The outlet line 16 may have a vertical extension of one meter to ten meters. A vertical drop of water below the filtering element 14 is thereby provided by the outlet line 16. For this reason, the outlet line 16 may be referred to as a drop pipe. A water drop of five meters in the outlet line 16 may correspond to a differential pressure of 500 mbar over the filtering element 14, and a water drop of eight meters in the outlet line 16 may correspond to a differential pressure of 800 mbar over the filtering element 14.

The filtration apparatus **28*a* further comprises an outlet valve 52. The outlet valve 52 is one example of a liquid outlet device according to the present disclosure. One alternative example of a liquid outlet device according to the present disclosure is a liquid pump. By controlling the outlet valve 52, a collection volume liquid flow 54 out from the collection tank 32 through a collection outlet 82 can be controlled. The outlet valve 52 is positioned in a geodetically low region of the collection tank 32, such as in a vertically lowest half of a height of the collection tank 32, such as in a vertically lowest quarter of the height of the collection tank 32. The outlet valve 52 is in signal communication with the control system 36. The control system 36 can control an opening degree of the outlet valve 52**.

The filtration apparatus **28*a* further comprises a vacuum pump 56. The vacuum pump 56 is one example of a gas outlet device according to the present disclosure. The vacuum pump 56 is arranged in parallel with the outlet valve 52**.

The vacuum pump 56 is configured to suck gases 58 out from the top of the collection tank 32 to thereby evacuate the gases 58. By controlling the vacuum pump 56, a gas flow 60 out from the collection tank 32 can be controlled. The vacuum pump 56 is positioned in, and connected to, a geodetically highest region of the collection tank 32. The vacuum pump 56 is in signal communication with the control system 36. The control system 36 can control a speed of the vacuum pump 56, for example by means of a variable frequency drive.

The collection tank 32 is positioned downstream of the outlet line 16. As shown in FIG. 3, the collection tank 32 is closed to atmosphere. In this example, the only interfaces out from the interior volume of the collection tank 32 are through the outlet line 16, through the outlet valve 52 and through the vacuum pump 56.

The collection tank 32 houses a large horizontal area in relation to its height. This horizontal area may for example be at least twice the square of its height, such as at least four times the square of its height. This flat design of the collection tank 32 promotes release of gases 58 from the water 34. The collection tank 32 may for example have a cuboidal shape.

The filtration apparatus 28*a* may optionally comprise further equipment to promote the release of gases 58 in the collection tank 32. Examples of such equipment include a spraying device for spraying the water 34, a stirring device for stirring the water 34, and an air injection device for injecting air, such as ozone enriched air, into the water 34. Such further equipment may for example be provided in the collection tank 32.

The filtration apparatus 28*a* may optionally comprise further equipment to treat the water 34. Examples of such equipment include a deironization device for deironizing the water 34, a demanganization device for removing compounds of manganese from the water 34, a water softening device for softening the water 34, a desalination device for desalinating the water 34, and a pH-adjusting device for adjusting the pH-value of the water 34, an ultraviolet device for subjecting the water 34 to ultraviolet radiation, and a chemical processing device for subjecting the water 34 to various chemical treatments (e.g. chlorination). Such further equipment may for example be provided in the collection tank 32.

The filtration apparatus 28*a* further comprises an inlet level sensor 62. By means of the inlet level sensor 62, an inlet level of water in the vessel 12 can be monitored. The inlet level sensor 62 is in signal communication with the control system 36.

The filtration apparatus 28*a* further comprises an outlet level sensor 64. By means of the outlet level sensor 64, an outlet level 66 of water 34 in the collection tank 32 can be monitored. The outlet level sensor 64 is in signal communication with the control system 36.

The filtration apparatus 28*a* further comprises a temperature sensor 68. The temperature sensor 68 of this example is arranged in the collection tank 32. By means of the temperature sensor 68, a temperature of the water 34 in the collection tank 32 can be monitored. The temperature sensor 68 is in signal communication with the control system 36.

The filtration apparatus 28*a* further comprises a pressure sensor 70. The pressure sensor 70 is configured to monitor an underpressure of the water. The pressure sensor 70 of this example is positioned in the outlet line 16. The pressure sensor 70 is in signal communication with the control system 36.

The filtration apparatus 28*a* further comprises a cleaning device 72. The cleaning device 72 is configured to clean a passive part the filtering element 14, i.e. outside a filtration area below the vessel 12. The cleaning device 72 is configured to force filtride or filter cake away from the filtering element 14. To this end, the cleaning device 72 may for example comprise a plurality of air knives. Also the cleaning device 72 may be in signal communication with the control system 36.

In this example, the inlet line 42, the vessel 12, the filtering element 14, the restriction plates 24, the rollers 20 and the motor 18 are provided in the filtration unit 10, and the collection tank 32, the vacuum pump 56 and the outlet valve 52 are provided in the collection unit 30. An upper part of the outlet line 16 may be provided in the filtration unit 10 and a lower part of the outlet line 16 may be provided in the collection unit 30. The upper part and the lower part of the outlet line 16 may be connected at a filtration site. The filtration unit 10 and the collection unit 30 are modules that can be transported separately. The filtration unit 10 and the collection unit 30 can be connected and disconnected when desired. The control system 36 may for example be provided in the filtration unit 10 or may be remotely located.

In the following, a method of filtrating polluted water to become drinking water will be described. The method has an enormous impact on killing bacteria, parasites and other living organisms in the water.

Polluted water is conducted through the inlet line 42 to the vessel 12. The inlet flow 46 is controlled by means of the inlet valve 44 based on signals from the inlet level sensor 62. In this way, the inlet level of water in the vessel 12 can be controlled, for example to a constant level. Coarse particles in the water are filtered by the upstream filter 22. Finer particles are filtered by the filtering element 14. The filtering element 14 may move continuously during filtration, but the filter speed may be controlled.

As the water moves downstream in the outlet line 16, more room is made available upstream of the water in the outlet line 16 below the filtering element 14. An underpressure is thereby created in the outlet line 16 below the filtering element 14. This underpressure can be measured by the pressure sensor 70. The temperature of the water may for example be 20° C. In this case, the water boils at an underpressure of 0.1 bar. When the underpressure is reduced (to a lower absolute pressure value), the filter flow through the filtering element 14 is increased.

The difference between the atmospheric, or substantially atmospheric, pressure upstream of the filtering element 14 and the underpressure downstream of the filtering element 14 constitutes a differential pressure over the filtering element 14. By means of the geodetic difference in height of the outlet line 16, the gravity force of the water column in the outlet line 16 pulls the water through the filtering element 14 to establish a differential pressure over the filtering element 14. In this way, a liquid pump for driving the water out from the collection tank 32 can be avoided and the energy efficiency of the filtration apparatus 28*a* can thereby be improved.

Although bacteria can survive quite rapid and high pressure increases, bacteria cannot survive rapid pressure decreases. The method exploits this phenomenon by subjecting the water to a rapid pressure decrease over the filtering element 14. In this way, any living organisms in the water will be killed.

For example, if the filter flow of water through the filtering element 14 is 400 l/s, the pore size of the filtering element 14 is 10 μm, the porosity of the filtering element 14 is 44%, and the pressure drop coefficient is 1680, the pressure drop through the filtering element 14 will be 320 mb and the flow speed of the water will be 400 mm/s. The flow speed of water through the filtering element 14 can be determined as the thickness of the filtering element 14 divided by the active filter area of the filtering element 14.

If the thickness of the filtering element 14 is 0.21 mm and the flow speed is 400 mm/s, the passing time, i.e. the time it will take for the water to change from slightly above atmospheric pressure upstream of the filtering element 14 to the underpressure, is 0.525 ms. The passing time can be determined as the thickness of the filtering element 14 divided by the flow speed. Since the water is pulled through the filtering element 14, the flow speed will change from 0 m/s to 0.4 m/s in 0.525 ms. This gives an acceleration of 761.9 $m/s^2$. The g-force of this acceleration is 77.66 g.

The energy release E [J] of the water can be determined as:

$$E = m \cdot g \cdot d \quad [1]$$

where m is the mass of the water [kg], g is the gravity of Earth [N/kg] and d is the distance [m]. The energy release of 400 liters will then be 12.56 kJ since the pressure drop of 320 mbar corresponds to a distance of 3.2 meters. Since the energy release happens during the passing time of 0.525 ms in this example, the energy release will be 60 kJ/liter. Thus, a huge amount of energy can be released from the water in a very short time. The fast pressure drop of the water kills bacteria and other living organisms in the water. The amount of energy released will depend on the filter flow of water, the passing time through the filtering element 14 and the differential pressure.

During operation of the filtration apparatus 28*a*, the outlet level 66 in the collection tank 32 is controlled by means of the outlet valve 52. By increasing an opening degree of the outlet valve 52, the water level in the collection tank 32 will sink. As a consequence, the underpressure in the outlet line 16 will be reduced. This in turn causes the differential pressure over the filtering element 14 to be increased and the passing time to be shortened. The differential pressure and passing time can therefore be controlled by the outlet valve 52.

If the inlet valve 44 remains with a constant opening, an increased opening degree of the outlet valve 52 will also cause the water level in the vessel 12 to sink. Several operational parameters of the filtration apparatus 28*a* can thus be controlled by means of the outlet valve 52.

The active filter area is known, for example by checking the status of each restriction plate 24. By adjusting the filter flow of water through the filtering element 14, the passing time through the filtering element 14 can be accurately controlled. Thus, the time it takes for the water to undergo the differential pressure can be accurately controlled. The energy release from the water when passing through the filtering element 14 can thereby also be accurately determined and controlled. The method may comprise controlling the passing time to be less than 0.1 s and controlling the differential pressure to at least 0.1 bar. The passing time and the differential pressure are controlled in conjunction to obtain a controlled pressure drop over the filtering element 14 during a particular passing time, such as a target energy release per volume of water during the passing time. The shorter the passing time is and the higher the differential pressure is, the higher the energy release will be.

In case the output flow from the vacuum pump 56 is reduced, the gases 58 released from the water in the collection tank 32 will gradually push the water level down. As a consequence, the underpressure in the outlet line 16 will increase. This in turn causes the differential pressure over the filtering element 14 to be decreased. The differential pressure and the passing time can therefore be controlled also by the vacuum pump 56. By decreasing the speed of the vacuum pump 56 when the outlet level 66 is high, it can further be prevented that the vacuum pump 56 starts sucking water from the collection tank 32. Conversely, by increasing the speed of the vacuum pump 56 when the outlet level 66 is low, it can be prevented that the gases 58 enter the outlet line 16.

After a certain number of filtration cycles, with intermediate cleaning by the cleaning device 72, the filtering element 14 has a constant permeability. The differential pressure through the filtering element 14 can then be accurately controlled in a less complicated manner, for example by adjusting the filter speed of the filtering element 14 and/or by adjusting filter flow of the water through the filtering element 14.

Due to the design of the filtration apparatus 28*a*, the water 34 enters the collection tank 32 from the outlet line 16 with a turbulent flow. This turbulence promotes the release of gases 58 from the water 34. Also the relatively large horizontal area of the collection tank 32 promotes release of gases 58 from the water 34. The gases 58 may comprise carbon dioxide, nitrogen, dioxygen and ammonium generated by membrane rupture of the living organisms in the water.

The vacuum pump 56 sucks gases 58 out from the top of the collection tank 32 and discharges the gases 58 to the atmosphere. In this way, the water level in the collection tank 32 can be held constant. The vacuum pump 56 is therefore synchronized with the underpressure in the outlet line 16.

The collection tank 32 provides several advantages. The collection tank 32 enables a steady differential pressure over the filtering element 14 to be held, to thereby provide a steady filter flow through the filtering element 14. Moreover, the collection tank 32 gives the water 34 the necessary holding time for allowing the gases 58 to elevate to the surface and provides a large free surface area of the water 34 for degassing.

The method can be performed with different fineness of the filtering element 14 and with different active filter areas. The method can thus be carried out with a wide range of different filtering elements 14. The finer the filtering element 14 is, the easier it becomes to establish a high differential pressure over the filtering element 14 with a low flow speed.

As shown in FIG. 3, the filtration apparatus 28*a* has a very compact design, for example in comparison with prior art filtration systems for degassing carbon dioxide and nitrogen form dirty water from fish tanks. The method and the filtration apparatus 28*a* have been tested by the inventors and have proven to function very well.

In order to check the quality of the water 32, a part of the collection volume liquid flow 54 may be diverted to a bypass line comprising one or more measuring devices (not illustrated). The measuring devices can also be arranged directly in the collection volume liquid flow 54. Such measuring devices may be in signal communication with the control system 36.

Figure 4:
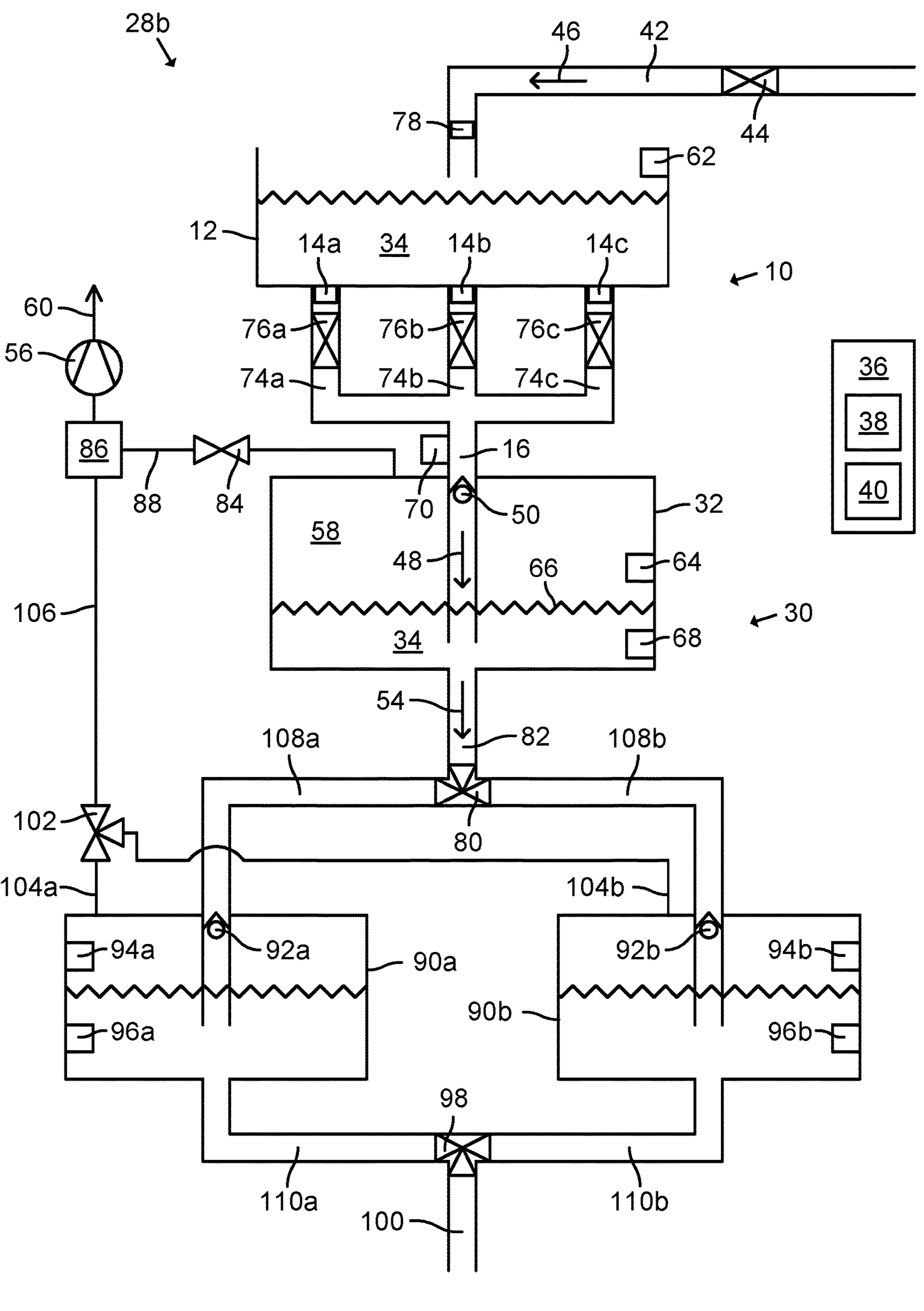
FIG. 4: schematically represents a cross-sectional side view of a further example of a filtration apparatus.

FIG. 4 schematically represents a cross-sectional side view of a further example of a filtration apparatus 28*b*. Mainly differences with respect to the filtration apparatus 28*a* in FIGS. 1 to 3 will be described.

The filtration apparatus 28*b* of this specific example comprises a first filtering element 14*a*, a second filtering element 14*b* and a third filtering element 14*c*. Each filtering element 14*a*-14*c* may for example have a pore size of at least 1 μm, less than 50 μm and/or a thickness of 0.20 mm to 0.25 mm.

Moreover, the outlet line 16 comprises a first outlet section 74*a*, a second outlet section 74*b* and a third outlet section 74*c*. The filtration apparatus 28*b* further comprises a first filter valve 76*a* in the first outlet section 74*a* downstream of the first filtering element 14*a*, a second filter valve 76*b* in the second outlet section 74*b* downstream of the second filtering element 14*b*, and a third filter valve 76*c* in the third outlet section 74*c* downstream of the third filtering element 14*c*. The outlet sections 74*a*-74*c* converge to a single drop pipe downstream of the respective filter valves 76*a*-76*c*. The outlet line 16 of this example thus has a plurality of geodetically highest ends, each associated with one of the filtering elements 14*a*-14*c*. Also the outlet line 16 of this example may comprise a vertical extension of one to ten meters, e.g. from the filtering elements 14*a*-14*c* to a geodetically lowest point inside the collection tank 32. The outlet line 16 of this example may be referred to as an outlet line arrangement.

The filtration apparatus 28*b* of this example further comprises an upstream filter 78 arranged inside the inlet line 42. The upstream filter 78 is here exemplified as a prefilter. The upstream filter 78 has a substantially higher permeability than the filtering elements 14*a*-14*c* and may therefore be referred to as a coarse filter.

Instead of the outlet valve 52, the filtration apparatus 28*b* of this example comprises a first three-way valve 80. The first three-way valve 80 is in signal communication with the control system 36. The control system 36 can control the opening degree of the first three-way valve 80. The first three-way valve 80 is a further example of a liquid outlet device according to the present disclosure. As shown in FIG. 4, the first three-way valve 80 is here positioned geodetically below the collection tank 32 in a collection outlet 82.

By means of the first three-way valve 80, water can be selectively led to either a primary first line 108*a* or a secondary first line 108*b*. The collection outlet 82 branches into the primary first line 108*a* and the secondary first line 108*b*. As shown in FIG. 4, the first three-way valve 80 is positioned at a junction between the collection outlet 82, the primary first line 108*a* and the secondary first line 108*b*.

The filtration apparatus 28*b* of this example further comprises a collection gas valve 84 and a vacuum tank 86. The collection gas valve 84 is positioned on a collection gas line 88 fluidly between the vacuum tank 86 and the collection tank 32. The vacuum tank 86 is positioned fluidly between the collection gas valve 84 and the vacuum pump 56. The collection gas valve 84 is in signal communication with the control system 36. The vacuum pump 56 is arranged in parallel with the first three-way valve 80. When the collection gas valve 84 is open, the vacuum pump 56 can suck gases 58 out from the top of the collection tank 32. In FIG. 4, the only interfaces out from the interior volume of the collection tank 32 are through the outlet line 16, through the first three-way valve 80 and through the vacuum pump 56.

In this example, the inlet line 42, the upstream filter 78, the vessel 12, the filtering elements 14*a*-14*c*, the filter valves 76*a*-76*c* and the outlet sections 74*a*-74*c* are provided in the filtration unit 10.

The filtration apparatus 28*b* of this example further comprises a primary downstream tank goa and a secondary downstream tank 90*b*. The downstream tanks 90*a* and 90*b* are examples of downstream volumes according to the present disclosure. The downstream tanks 90*a* and 90*b* are arranged in parallel. This contributes to an operational redundancy of the filtration apparatus 28*b*. The primary first line 108*a* conducts water from the collection outlet 82 into the primary downstream tank 90*a* and the secondary first line 108*b* conducts water to the secondary downstream tank 90*b* (when the first three-way valve 80 is correspondingly opened).

The primary downstream tank 90*a* comprises a primary valve 92*a*, a primary high level sensor 94*a* and a primary low level sensor 96*a*. Correspondingly, the secondary downstream tank 90*b* comprises a secondary valve 92*b*, a secondary high level sensor 94*b* and a secondary low level sensor 96*b*. The primary valve 92*a* and the secondary valve 92*b* are here exemplified as check valves. The primary valve 92*a* is positioned in the primary first line 108*a* and the secondary valve 92*b* is positioned in the secondary first line 108*b*. The high level sensors 94*a* and 94*b* and the low level sensors 96*a* and 96*b* are in signal communication with the control system 36.

The filtration apparatus 28*b* of this example further comprises a second three-way valve 98. The second three-way valve 98 is in signal communication with the control system 36. The second three-way valve 98 is positioned geodetically below the downstream tanks 90*a* and 90*b*. By means of the first three-way valve 80 and the second three-way valve 98, the collection volume liquid flow 54 from the collection outlet 82 can be selectively led to one of the downstream tanks 90*a* and 90*b* while the other of the downstream tanks 90*a* and 90*b* is drained through a final outlet 100 downstream of the second three-way valve 98, e.g. for consumption. Thus, one of the downstream tanks 90*a* and 90*b* can be filled at the same time as the other of the downstream tanks 90*a* and 90*b* is being emptied.

As shown in FIG. 4, the filtration apparatus 28*b* of this example further comprises a primary second line 110*a* and a secondary second line 110*b*. The primary second line 110*a* leads water out from the primary downstream tank 90*a* and the secondary second line 110*b* leads water out from the secondary downstream tank 90*b*. The primary second line 110*a* and the secondary second line 110*b* branch into the final outlet 100. In this example, the second three-way valve 98 is positioned in a junction between the primary second line 110*a*, the secondary second line 110*b* and the final outlet 100.

The filtration apparatus 28*b* further comprises a downstream gas valve 102, here exemplified as a three-way valve. The downstream gas valve 102 is in signal communication with the control system 36. The downstream gas valve 102 is connected to the primary downstream tank goa via a primary gas line 104*a*, to the secondary downstream tank 90*b* via a secondary gas line 104*b*, and to the vacuum tank 86 via a common gas line 106.

The collection unit 30 of this example comprises the collection tank 32, the vacuum pump 56, the first three-way valve 80, the second three-way valve 98, the primary downstream tank 90*a*, the secondary downstream tank 90*b*, the collection gas valve 84, the downstream gas valve 102 and the vacuum tank 86. Similarly to the filtration apparatus 28*b* in FIG. 3, an upper part of the outlet line 16 may be provided in the filtration unit 10 and a lower part of the outlet line 16 may be provided in the collection unit 30.

The filtration apparatus 28*b* can be controlled in a corresponding way as the filtration apparatus 28*a* to filtrate polluted water to become drinking water. Coarse particles in the water are filtered by the upstream filter 78. Finer particles are filtered by one or more of the filtering elements 14*a*-14*c*. The rapid pressure decrease over one or more active filtering elements 14*a*-14*c* kills living organisms in the water.

An active filter area can be changed by selectively opening one or more of the filter valves 76*a*-76*c*. According to one variant, each of the outlet sections 74*a*-74*c* has a unique cross-sectional area. In this way, more options for setting an active filter area by means of the filter valves 76*a*-76*c* become available. Moreover, each filtering element 14*a*-14*c* may have unique characteristics, such as unique porosity and/or thickness. By selectively activating one or more of the filtering elements 14*a*-14*c* by opening an associated filter valve 76*a*-76*c*, the differential pressure of the liquid over the one or more active filtering elements 14*a*-14*c* and the passing time therethrough can be controlled.

The parallel arrangement of the filtering elements 14*a*-14*c* also enables one filtering element 14*a*-14*c* to be replaced or cleaned while one or more of the other filtering elements 14*a*-14*c* remain in operation. This contributes to an operational redundancy of the filtration apparatus 28*b*.

When the primary downstream tank goa is being filled, the control system 36 controls the first three-way valve 80 to guide water from the collection outlet 82 into the primary downstream tank 90*a*, controls the second three-way valve 98 to close an outlet from the primary downstream tank 90*a*, and controls the downstream gas valve 102 to open the primary gas line 104*a* to the common gas line 106. At the same time, the control system 36 controls the first three-way valve 80 to prevent water from the collection outlet 82 to enter the secondary downstream tank 90*b*, controls the second three-way valve 98 to open an outlet from the secondary downstream tank 90*b*, and controls the downstream gas valve 102 to close the secondary gas line 104*b* to the common gas line 106. When the primary downstream tank goa has been filled, as determined by the primary high level sensor 94*a*, the above control is switched.

The first three-way valve 80, the second three-way valve 98 and the downstream gas valve 102 are controlled based on readings from the high level sensors 94*a* and 94*b* and the low level sensors 96*a* and 96*b*. The final outlet 100 may have a larger cross-sectional area than the collection outlet 82. In this way, the draining of one of the downstream tanks 90*a* and 90*b* is faster than a filling of the other of the downstream tanks 90*a* and 90*b*. The filtration apparatus 28*b* can filtrate water at a very low power consumption, such as 1.5 kWh. This makes the filtration apparatus 28*b* excellent for providing safe drinking water in small communities.

As one possible modification of the filtration apparatus 28*b*, the downstream tanks 90*a* and 90*b* may be omitted. In this case, the final outlet 100 may be constituted by the collection outlet 82.

Figure 5:
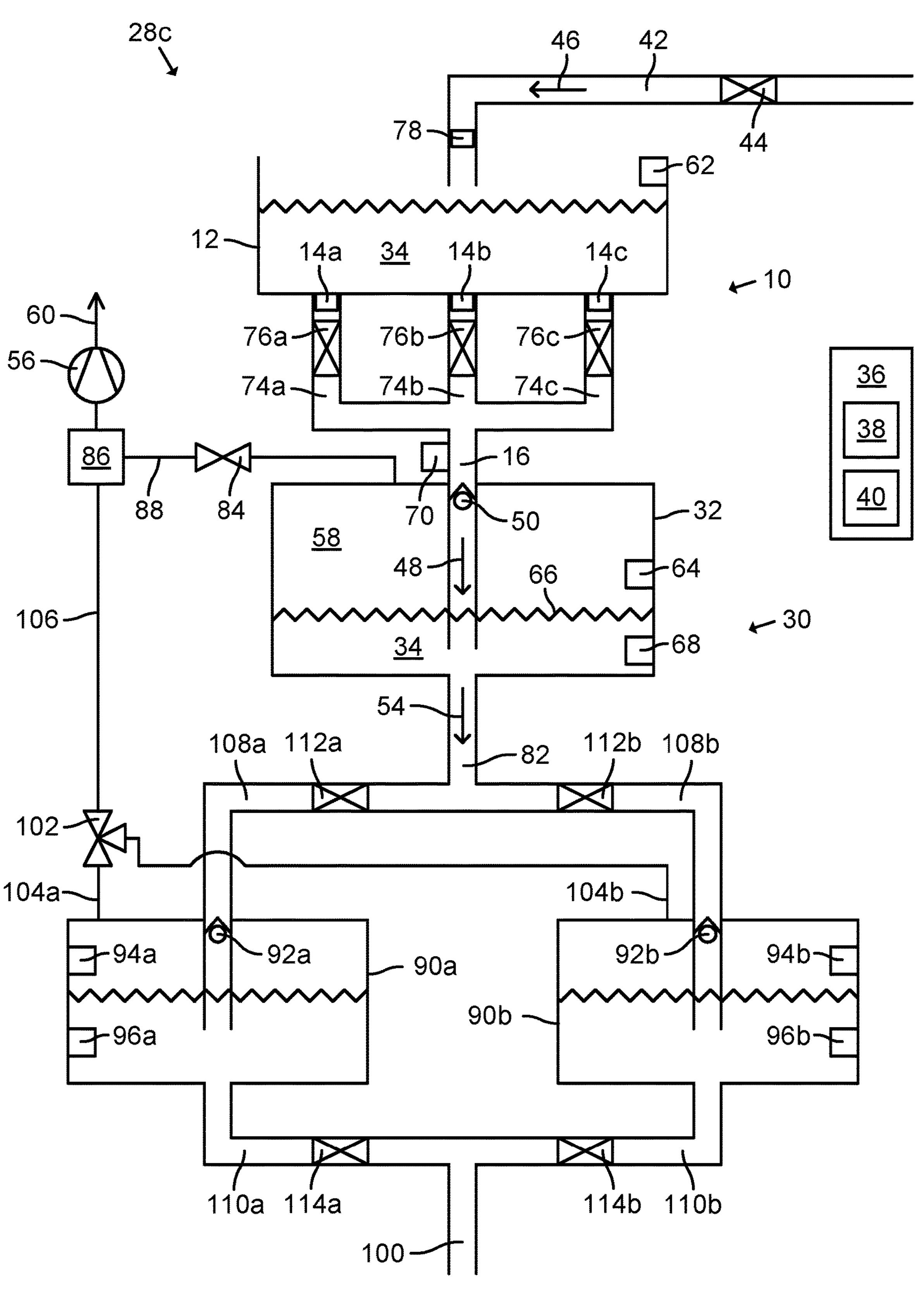
FIG. 5: schematically represents a cross-sectional side view of a further example of a filtration apparatus.

FIG. 5 schematically represents a cross-sectional side view of a further example of a filtration apparatus 28*c*. Mainly differences with respect to the filtration apparatus 28*b* will be described. Instead of the first three-way valve 80, the filtration apparatus 28*c* comprises a primary first valve 12*a* in the primary first line 108*a* and a secondary first valve 112*b* in the secondary first line 108*b*. The primary first valve 12*a* and the secondary first valve 112*b* constitute a further example of a liquid outlet device according to the present disclosure. Each of the primary first valve 12*a* and the secondary first valve 112*b* is in signal communication with the control system 36. The control system 36 can control an opening degree of each of the primary first valve 112*a* and the secondary first valve 112*b*. In this example, the collection outlet 82 may be omitted and each of the primary first line 108*a* and the secondary first line 108*b* may instead be directly connected to the collection tank 32.

Furthermore, instead of the second three-way valve 98, the filtration apparatus 28*c* comprises a primary second valve 14*a* in the primary second line 110*a* and a secondary second valve 114*b* in the secondary second line nob. Each of the primary second valve 14*a* and the secondary second valve 114*b* is in signal communication with the control system 36. The control system 36 can control an opening degree of each of the primary second valve 114*a* and the secondary second valve 114*b*.

The method and the filtration apparatus find application where bacteria in a liquid are to be reduced or completely eliminated. The method and the filtration apparatus are not limited to the specific examples given. Accordingly, it is intended that the present invention may be limited only by the scope of the claims appended hereto.

The invention claimed is:

1. A method of filtrating liquid, the method comprising:
conducting a liquid through a filtering element, through an outlet line downstream of the filtering element and to a collection volume downstream of the outlet line, the collection volume being closed to atmosphere; and
providing a controlled energy release from the liquid in order to kill living organisms by subjecting the liquid to controlled pressure drop over the filtering element by:
controlling a differential pressure of the liquid over the filtering element, and
controlling a passing time of a filter flow of the liquid through the filtering element in conjunction with the differential pressure,
wherein the control of the differential pressure and the passing time comprises:
controlling a collection volume liquid flow of the liquid out from the collection volume, and
controlling a gas flow out from the collection volume.

2. The method according to claim 1, wherein the control of the differential pressure and/or the control of the passing time further comprises:
controlling an inlet flow of the liquid to the filtering element;
controlling a filter speed of the filtering element;
controlling an active filter area of the filtering element;
controlling the filter flow;
controlling a flow speed of the filter flow; and/or
controlling an outlet line flow of the liquid in the outlet line.

3. The method according to claim 1, wherein the outlet line has a geodetic difference in height of at least one meter.

4. The method according to claim 1, wherein the differential pressure is established by means of downstream movement of the liquid in the outlet line.

5. The method according to claim 1, wherein the passing time is controlled to be less than 0.1 s.

6. The method according to claim 1, wherein the differential pressure is controlled to at least 0.1 bar.

7. The method according to claim 1, wherein the filtering element has a substantially constant permeability for filtrations after a nominal degree of clogging of the filtering element.

8. The method according to claim 1, wherein the collection volume has a horizontal extension and a vertical extension, and wherein the horizontal extension is larger than the vertical extension.

9. A filtration apparatus for filtrating liquid, the filtration apparatus comprising:
a filtering element;
an outlet line downstream of the filtering element;
a collection volume downstream of the outlet line, the collection volume being closed to atmosphere;
a liquid outlet device configured to control a collection volume liquid flow of the liquid out from the collection volume;
a gas outlet device configured to control a gas flow out from the collection volume; and a control system configured to:

provide a controlled energy release from the liquid in order to kill living organisms by subjecting the liquid to controlled pressure drop over the filtering element by:

controlling a differential pressure of the liquid over the filtering element, and controlling a passing time of a filter flow of the liquid through the filtering element in conjunction with the differential pressure, wherein the control of the differential pressure and the passing time comprises:

controlling the liquid outlet device to control the collection volume liquid flow, and controlling the gas outlet device to control the gas flow.

10. The filtration apparatus according to claim 9, further comprising a motor for moving the filtering element, wherein the control system is configured to control the motor to thereby control a filter speed of the filtering element in order to at least partly control the differential pressure and/or the passing time.

11. The filtration apparatus according to claim 9, wherein the control of the differential pressure and the passing time further comprises:

controlling an inlet flow of the liquid to the filtering element;

controlling a filter speed of the filtering element;

controlling an active filter area of the filtering element;

controlling the filter flow;

controlling a flow speed of the filter flow; and/or controlling an outlet line flow of the liquid in the outlet line.

12. The filtration apparatus according to claim 9, wherein the outlet line has a geodetic difference in height of at least one meter.

13. The filtration apparatus according to claim 9, wherein the filtration apparatus is configured to establish the differential pressure by means of downstream movement of the liquid in the outlet line.

14. The filtration apparatus according to claim 9, wherein the control system is configured to control the passing time to be less than 0.1 s.

15. The filtration apparatus according to claim 9, wherein the control system is configured to control the differential pressure to at least 0.1 bar.

16. The filtration apparatus according to claim 9, wherein the filtering element has a substantially constant permeability for filtrations after a nominal degree of clogging of the filtering element.

17. The filtration apparatus according to claim 9, wherein the collection volume has a horizontal extension and a vertical extension, and wherein the horizontal extension is larger than the vertical extension.

* * * * *